United States Patent Office 3,287,307
Patented Nov. 22, 1966

3,287,307
METHOD FOR PREPARATION OF THE SOLUTION OF ACRYLONITRILE POLYMER
Masakazu Taniyama, Ichiro Kanda, Michiaki Nakajima, and Makoto Amiya, Kitajima-machi, Japan, assignors to Toho Rayon Kabushiki Kaisha, Chuo-ku, Tokyo, Japan, a corporation of Japan
No Drawing. Filed Mar. 29, 1965, Ser. No. 443,650
8 Claims. (Cl. 260—29.6)

This application is a continuation-in-part of copending application Serial No. 122,410, filed July 7, 1961, and now abandoned.

This invention relates to an improved method for preparation of polyacrylonitrile solution from which shaped articles such as threads, fibers, filaments and the like are produced, and more particularly to such process wherein a novel combined catalyst system for polymerization is used so as to attain the homogeneous solution polymerization of monomeric acrylonitrile in a concentrated aqueous saline solution. The term "polyacrylonitrile" or simply "polymer" as used in this specification includes homopolymer of acrylonitrile and copolymers of acrylonitrile at least 85% by weight together with up to 15% by weight of one or more of ethylenically unsaturated polymerizable compounds comprising methyl acrylate, methyl methacrylate, vinyl acetate, allyl alcohol and the like. The term "monomeric acrylonitrile" or simply "monomer" as used herein includes acrylonitrile and the mixture thereof with another or others formable such polyacrylonitrile as defined above.

Hithertofore numerous researches have been devloped on the polymerization of the monomers so that variety of techniques may be utilized for the manufacture of polyacrylontile and for the preparation of its solution from which various shaped articles, particularly fibers, can be formed.

Among them it has been usual to prepare the polymer in water, wherein the polymerization initiator consisting of a simple radical forming agent or of the mixture of a reducing agent and oxidizing agent which is called Redox system may be used in the presence or absence of an additive such as emulsifier, retarder, modifier and the like in order to control the manner of polymerization. This polymerization technique, of course, can be done batchwise or continuously and in either case the resulting polymer is precipitated from the polymerization medium due to its insolubility. Thus, this mode of polymerization may be called "heterogeneous polymerization" or "precipitation polymerization." The polymer obtained in accordance with the precipitation polymerization is, after filtration, washing and drying treatments, dissolved in a solvent to prepare the spinning solution. In this process the polymerization operation is not directly connected to the spinning operation and consequently the control of polymerization can be rather freely done. In other words the final relative conversion of polymerization, polymerization rate and molecular weight of the resulting polymer can be controlled independently of each other. The term "relative conversion of polymerization" shall be referred to simply as "conversion" hereinafter.

On the other hand, in the case of the so-called "solution polymerization" the polymerization is carried out in the solvent dissolving both the monomer and polymer in the homogeneous solution phase. The solution polymerization is desirable, when the resulting solution is used in situ as the spinning solution, in view of the simplicity of the steps and consequently in the point of view of the commerce or economy, while there occur various difficulties in directly connecting the polymerization operation to the spinning operation. Some of the solvents used will hinder the polymerization reaction and some will form such polymer solutions having viscosities which will be too high for spinning.

Above all when the concentrated saline solution comprising mainly zinc chloride is used as solvent, although the polymerization reaction per se is not hindered thereby, the final conversion does not reach up to the desirable value, the control of the molecular weight is difficult and the polymerization rate is extraordinary due to the complicated interreaction between the solvents, monomers, polymers, polymerization initiators and the like. Thus, particular considerations should be taken in selecting the polymerization conditions for said solution polymerization.

In the first place, it is desired to increase the final conversion to the utmost so that the loss of the monomers may be minimized. Next, molecular weight of the resulting polymer must be in a specific range desirable for spinning, 50,000–130,000 as calculated by Staudinger's equation. Furthermore, the polymerization rate has to be controlled at a moderate velocity, since if it is too high the viscosity of the resulting polymer solution will be too rapidly increased to keep uniform the viscosity and temperature of the polymer solution, the uniformity of which is to cause unevenness of the polymerization and consequently of the spinnability. In addition the initial concentration of the monomers should be in such range as produce desirable viscosity and polymer content in the resulting polymer solution to be used for spinning in situ.

The behavior of the solution polymerization in the saline solvent comprising mainly zinc chloride is quite different from those of the precipitation polymerization in water. In the solution polymerization in aqueous zinc chloride solution of U.S. Patent 2,763,636 to Davis, the polymerization is initiated with use of hydrogen peroxide or potassium persulphate only, while in the precipitation polymerization in water, for instance as set forth in Trans. Farad. Soc., vol. 42, p. 147 (1946), by Bacon, there occurs merely slight polymerization with use of the same catalyst even after considerably elongated reaction period. Furthermore, according to Davis the presence of cupric ion lowers the polymerization rate in the former but in the latter it is increased.

It should also be noted that the polymer which is produced in accordance with the precipitation polymerization initiated by the persulphate such as potassium persulphate alone possesses considerable dyeability for cationic dyes perhaps owing to the fragment of the initiator attached to the end of the polymer molecule [cf. Clenz: Melli. Textilber., vol. 38, 296 (1957)]. According to the inventors' study, however, the polymer produced in the saline solvent with the same initiator has been found to have no dyeability.

From the facts as described hereinbefore it will be noted that the conditions of the solution polymerization in the saline solvent comprising mainly zinc chloride are not deducible from those of the precipitation polymerization in water and that the advantage may be attained in this field if the dyeability of the produced polymer is improved simply by the action of initiator without copolymerizing any dyeable comonomers which may often adversely affect the polymerization reaction.

Thus, an object of the invention is to provide the industrially useful process of the type as mentioned above whereby the polymer solution having been obtained through the homogeneous solution polymerization can be used in situ as the spinning solution and that the problems, which have been referred to above, to occur when the concentrated saline solution comprising mainly zinc chloride is used as solvent for the solution polymerization can be solved.

Another object is to provide the process whereby the shaped articles such as fibers having improved dyeability owing to the action of the novel catalyst system used for the polymerization without copolymerizing any comonomers which have the functional group for improving dyeability.

For the solution polymerization in the saline solvent comprizing mainly zinc chloride, we have tested the typical initiators and modifiers usually used in the precipitation polymerization but scarcely obtained satisfactory results. For example, the redox system such as persulfate-sulfite and chlorate-sulfite ($ClO_3^--SO_3^{--}$) produced a dyeable polymer but the polymerization rate was too high to be controlled. Hydrogen peroxide alone yielded undyeable polymer similarly to that obtained with use of persulfate alone. For the purpose of the molecular weight control, the usual modifier such as organic mercaptan was examined, which caused undesirable change of the characteristics of the polymer and the polymer solution.

In U.S. Patent 2,847,405 to Mallison the $ClO_3^--SO_3^{--}$ redox system is used at the specific range of the amount for the precipitation polymerization. When said redox system in such amount was examined for the solution polymerization in the saline solvent, however, undesirable results were obtained as seen in Tables 1–4.

TABLE 1

| Polymerization Time (min.) | 2 | 4 | 6 | 10 | 20 | 40 | 60 | 120 |
|---|---|---|---|---|---|---|---|---|
| Conversion (percent) | 62 | 76 | 82 | 86 | 93 | 96 | 98 | 98 |

Table 1 shows the relation between time and conversion in the polymerization reaction when using the system which is recommended in said patent to Mallison as the most preferable for the precipitation polymerization. There was used chloride acid as $ClO_3^-$ component in amount of 1.6% by weight of the weight of acrylonitrile as the monomer, and sulfurous acid as $SO_3^-$ component in amount of 3 times by mol of the mol of chloric acid. Polymerization reaction was carried out at the initial monomer concentration of 10% by weight of the weight of saline solvent comprising 49% zinc chloride, 10% sodium chloride and 41% water by weight and at a starting temperature of 40° C. The temperature control was very difficult due to considerable evolution of the polymerization heat because the reaction progressed too quickly. At the end of the reaction, the molecular weight of the polymer was 43,800 as calculated by Staudinger's equation. The results prove that the polymerization rate is too high. Even after initial two (2) minutes the conversion has already been raised up to 62%.

TABLE 2

| Polymerization Time (min.) | 4 | 10 | 20 | 40 | 60 | 120 |
|---|---|---|---|---|---|---|
| Conversion (percent) | 18 | 44 | 59 | 70 | 74 | 74 |

In order to lower the polymerization rate and to enable the control of the polymerization temperature, the quantity of the catalyst was decreased. Table 2 shows the relation between time and conversion through the solution polymerization at a well controlled temperature of 40° C. wherein chloric acid amounted to 0.397% by weight of the weight of acrylonitrile and sulfurous acid amounted to three (3) times by mol of the mol of chloric acid used. The molecular weight at the end of the reaction was 469,000 and the conversion reached the value of 74%. The molecular weight is too high while the conversion is too low.

TABLE 3

| Polymerization Time (min.) | 5 | 10 | 20 | 40 | 120 |
|---|---|---|---|---|---|
| Conversion (percent) | 26 | 45 | 61 | 71 | 76 |

According to the specification of U.S. Patent 2,763,636 to Davis, the molecular weight of the polymer can be lowered by means of addition of cupric ion. Thus, we investigated the influences of the addition of the trace amount of cupric ion (0.8 p.p.m. by weight of the weight of the monomer) with use of the said redox system of $ClO_3^--SO_3^{--}$. The procedure and conditions of Table 2 were followed except the addition of cupric ion. The molecular weight at the end of the reaction was 462,000 which did not show any effect of cupric ion for controlling the molecular weight. The molecular weight can not be lowered and the conversion is too low as seen in Table 3.

TABLE 4

| Polymerization Time (min.) | 4 | 10 | 20 | 40 | 60 | 120 |
|---|---|---|---|---|---|---|
| Conversion (percent) | 24 | 50 | 68 | 73 | 79 | 82 |

In this Table 4 are shown the results of the addition of cupric ion in amount of 50 p.p.m., which is recommended in U.S. Patent 2,847,405 for the precipitation polymerization, in the solution polymerization which was carried out under the just same condition as referred to in connection with Table 2 except the addition of cupric ion. Although the final conversion increased to some extent in comparison with the cases of absence of cupric ions, the polymerization rate was too accelerated. This tendency is not desirable for controlling the reaction temperature. The molecular weight of the polymer at the end of the reaction was 433,000. These results mean that the presence of cupric ions has failed to improve the control of the molecular weight and conversion.

Through the difficult investigations as referred to above it has been found by the inventors that the satisfactory results can be obtained by the use of a novel combined catalyst system which serves not only as the ideal initiator for homogeneous solution polymerization but also as a donor of dyeable site to the polymer molecule. This system enables an avoidance and overcomes the difficulties encountered to succeed in the preparation of a transparent and colorless polymer solution, in which the final conversion and molecular weight are desirable for using same in situ as the spinning solution and that the polymerization rate can be easily controlled, by polymerizing the monomer at its suitable concentration in a saline solvent comprizing mainly zinc chloride.

The combined catalyst system in this invention consists of a small quantity of oxy acid of chlorine and a relatively large quantity of reducing sulfoxy compound and of cupric ion. It has been found preferable to use the oxy acid of chlorine in an amount of 0.01–0.10% by mol of the mol of monomer, the cupric ion in an amount of 0.125–1.000% by mol of the mol of monomer and the reducing sulfoxy compound in a amount more than 10 times by mol of the mol of oxy acid of chlorine.

The combined catalyst system consisting of 0.0397% chloric acid, 1.18% sulfurous acid and 0.372% cupric ion respectively by weight of the weight of acrylonitrile proceeds the solution polymerization smoothly at the initial monomer concentration of 10% by weight of the weight of saline solvent comprising 48% zinc chloride, 11% sodium chloride and 41% water respectively by weight, and at a well controlled temperature of 50° C. The conversions in relation to the polymerization time is shown in Table 5. The polymerization rate was satisfactorily controlled in the industrial scale as shown therein. The molecular weight of the resulting polymer was 95,600 at the end of the reaction.

TABLE 5

| Polymerization Time (min.) | 4 | 10 | 20 | 40 | 60 | 90 | 120 |
|---|---|---|---|---|---|---|---|
| Conversion (percent) | 10 | 26 | 48 | 77 | 91 | 94 | 97 |

In the present invention, either chloric acid or hypochlorous acid, preferably in the form of a water-soluble metallic salt, is used as the oxy acid of chlorine. As the reducing sulfoxy compound, any one or more of sulfurous acid, pyrosulfurous acid, hydrosulfurous acid and their water-soluble metallic salts may be used. Sulfurous acid is used preferably in an amount of 20–50 times by mol of the mol of oxy acid of chlorine, while as to pyrosulfurous acid and/or hydrosulfurous acid it is preferable to use in an amount of 10–25 times by mol. Cupric chloride is preferably used as the source of cupric ion.

The saline solvent to be used in the solution polymerization in accordance with the present invention may be zinc chloride or the mixture thereof with the other metal salts such as NaCl, NH$_4$Cl, CaCl$_2$, MgCl$_2$ and the like. The total salt concentration is the aqueous solution as solvent is preferably in a range of 50–70% by weight. Various monomers may be added thereto but the desirable total amount thereof is 5–20% and more preferably 7–13% by weight of the weight of saline solvent. The reaction may be carried out at a temperature of 5–80° C. and more preferably of 40–60° C.

According to the present invention, the colorless polymer solution is smoothly obtainable, and by spinning it in situ a white and easily dyeable fiber can be produced at high efficiency.

In Table 6 are shown dyeabilities to cationic dyes of fibers I and II, the former being obtained from spinning the polymer solution of Table 5 in situ, the latter obtained similarly except using potassium persulfate as initiator in an amount of 1% by weight of the weight of monomer instead of our combined catalyst system.

TABLE 6

| Sample Cationic dye | Fiber I, percent | Fiber II, percent |
|---|---|---|
| Sevrone Blue 5 G | 97 | 1 |
| Basacryl Blue GL | 98 | 2 |

In this table, the dyeability is shown by exhaustion of the dye used in percent. The dyeing conditions are as follows:

Cationic dye _____ 2% by weight of the fiber.
Acetic acid _____ 0.05 gr./l.
Sodium acetate _____ 0.1 gr./l.
pH _____ 5.0
Dye bath medium _____ 100 times by weight of the fiber.
Temperature _____ 100° C.
Treatment time _____ 1 hour.

The present invention shall be set forth hereinafter in more detail not with the intension to limit the invention thereto but merely by way of example.

*Example 1*

1.5 parts of cupric chloride hydrate (CuCl$_2$·2H$_2$O) and 0.07 part of sodium chlorate (NaClO$_3$) were dissolved in 850 parts 60% aqueous zinc chloride solution and then 100 parts of acrylonitrile were added to this solution to form a homogeneous solution. To the resulting solution, a solution of 1.68 parts of sodium hydrosulfite in 50 parts of 60% aqueous zinc chloride solution was added at 60° C. with stirring, whereupon the polymerization is started at once. After 3 hours a transparent, colorless and fine polymer solution was obtained. The final conversion was 98% and the average molecular weight of polyacrylonitrile produced was 79,000.

The excellent fiber having high value of whiteness was prepared by extruding the polymer solution in an aqueous zinc chloride solvent of 15% concentration and spinning the coagulated product into fiber in accordance with the ordinary method. The dyeability to cationic dyes of this fiber was 98% defined as percent of the dye exhausted.

Another solution polymerization was similarly attempted except for the use of 0.1 part of cupric chloride hydrate, 0.01 part of sodium chlorate and 0.3 part of sodium hydrosulfite in contrast with the above. The conversion was merely 12% while the average molecular weight was too high as 190,000.

*Example 2*

1.0 parts of cupric chloride hydrate (CuCl$_2$·2H$_2$O) and 0.05 part of sodium chlorate were dissolved in 850 parts of the saline solvent containing 48% zinc chloride and 11% sodium chloride, and when 92 parts of acrylonitrile and 8 parts of methyl acrylate were added to this, the homogeneous solution was obtained.

A solution of 1.37 parts of sodium pyrosulfite in 50 parts of an aqueous solvent containing 48% zinc chloride and 11% sodium chloride was added to the above resulting solution at 50° C. with stirring, whereupon the polymerization started at once. After 2 hours the transparent, colorless and fine polymer solution was obtained. The final conversion was 96% and the average molecular weight of the copolymer produced was 85,400.

By extruding the polymer solution in saline solvent containing 12% zinc chloride and 3% sodium chloride and spinning in accordance with the ordinary method, the excellent fiber having the high value of whiteness and the strong affinity to cationic dyes was obtained.

*Example 3*

0.63 part of cupric chloride hydrate (CuCl$_2$·2H$_2$O) and 0.044 part of sodium hypochlorite were dissolved in 800 parts of the saline solvent containing 54% zinc chloride and 4% sodium chloride, and then 82 parts of acrylonitrile, 7 parts of methyl acrylate and 1 part of allyl alcohol were added to obtain homogeneous solution. A solution of 3.0 parts of sodium sulfite dissolved in 50 parts of the saline solvent containing 54% zinc chloride and 4% sodium chloride was added at 40° C. to said solution, whereupon the polymerization is started at once. After 3 hours the completely transparent, colorless polymer solution was obtained. The final conversion was 97% and the average molecular weight of copolymer produced was 88,000. The fiber obtained from this polymer solution has a high value of whiteness and high dyeability to cationic dyes.

*Example 4*

0.433 part of cupric chloride hydrate (CuCl$_3$·2H$_2$O) and 0.0416 part of sodium chlorate were dissolved in 1280 parts of the saline solvent containing 49% zinc chloride and 8% sodium chloride, and when 89 parts of acrylonitrile, 9 parts of methyl acrylate and 2 parts of methylmethacrylate were added to this, the homogeneous solution was obtained.

A solution of 1.50 parts of sodium sulfite dissolved in 50 parts of an aqueous solvent containing 49% zinc chloride and 8% sodium chloride was added to the above resulting solution at 50° C. with stirring, whereupon the polymerization started smoothly. After 3 hours the transparent, colorless and fine polymer solution was obtained, and the final conversion was 96% and the average molecular weight of copolymer produced was 123,000. By extruding the polymer solution in a saline solvent containing 12% zinc chloride and 3% sodium chloride and spinning in accordance with ordinary method, the excellent fiber having the high value of whiteness and the strong affinity to cationic dyes (dyeability 97%) was obtained.

*Example 5*

2.9 parts of cupric chloride hydrate (CuCl$_2$·2H$_2$O) and 0.17 part of sodium chlorate were dissolved in 620 parts of the saline solvent containing 49% zinc chloride and 8% sodium chloride, and then 89 parts of acrylonitrile, 9 parts of methyl acrylate and 2 parts of methylmethacrylate were mixed homogeneously. A solution of 5.03 parts of sodium sulfite dissolved in 50 parts of the saline solvent containing 49% zinc chloride and 8% sodium chloride was added at 40° C. to the above solution. Whereupon the polymerization started. After 2 hours the completely transparent, colorless polymer solution was obtained, and the final conversion was 98%, and the average molecular weight of copolymer produced was 51,000. The fiber obtained from this polymer solution has a high value of whiteness and strong dyeability for cationic dyes.

What we claim:

1. A method for the preparation of a spinning solution of acrylonitrile polymer selected from the group consisting of a copolymer of at least 85% acrylonitrile and up to 15% of methyl acrylate and a terpolymer of at least 85% acrylonitrile and up to 15% of methyl acrylate and allyl alcohol, comprising polymerizing the monomeric system of said polymer in an aqueous zinc chloride solution having a concentration of about 48 to 60%, and the monomer concentration is about 5 to 20% by weight based on the weight of the aqueous salt solution, at a temperature between 5° C. to 80° C., characterized in that polymerization is carried out in contact with an initiator comprising an oxy acid of chlorine in an amount of 0.01 to 0.1 percent by mol of the mol of monomer, reducing sulfoxy compounds in an amount of more than 10 times by mol of the mol of oxy acids of chlorine and cupric ion in an amount of 0.125 to 1 percent by mol of the mol of the monomer.

2. A method claimed in claim 1, wherein the monoethylenically unsaturated monomeric material is entirely acrylonitrile.

3. A method claimed in claim 1, wherein the oxy acid of chlorine is chloric acid in the form of a water-soluble salt.

4. A method claimed in claim 1, wherein the oxy acid of chlorine is hypochlorous acid in the form of a water-soluble salt.

5. A method claimed in claim 1, wherein the reducing sulfoxy compound is sulfurous acid in the form of a water-soluble salt.

6. A method claimed in claim 1, wherein the reducing sulfoxy compound is pyrosulfurous acid in the form of a water-soluble salt.

7. A method claimed in claim 1, wherein the reducing sulfoxy compound is hydrosulfurous acid in the form of a water-soluble salt.

8. A method claimed in claim 1, wherein the cupric ion is in the form of cupric chloride hydrate.

References Cited by the Examiner
UNITED STATES PATENTS

| | | | |
|---|---|---|---|
| 2,763,636 | 9/1956 | Davis | 260—88.7 |
| 2,847,405 | 8/1958 | Mallison | 260—85.5 |

JOSEPH L. SCHOFER, *Primary Examiner.*

H. WONG, *Assistant Examiner.*